United States Patent [19]

Halasa et al.

[11] 3,953,542

[45] Apr. 27, 1976

[54] PROCESS FOR GRAFTING ETHYLENE ONTO DIENE POLYMERS

[75] Inventors: Adel Farhan Halasa, Bath; Richard Gutierrez, Akron, both of Ohio

[73] Assignee: The Firestone Tire & Rubber Company, Akron, Ohio

[22] Filed: Oct. 17, 1974

[21] Appl. No.: 515,803

[52] U.S. Cl. .......................... 260/878 R; 260/878 B
[51] Int. Cl.² ................ C08F 279/02; C08F 257/02
[58] Field of Search ..................... 260/878 R, 878 B

[56] References Cited
UNITED STATES PATENTS

| | | | |
|---|---|---|---|
| 3,407,185 | 10/1968 | Natta et al. | 260/878 B |
| 3,699,190 | 10/1972 | Shimomura | 260/878 B |
| 3,734,978 | 5/1973 | Schwab | 260/878 B |
| 3,842,146 | 10/1974 | Milkovich et al. | 260/878 R |

FOREIGN PATENTS OR APPLICATIONS

| | | | |
|---|---|---|---|
| 1,151,941 | 7/1963 | Germany | 260/878 |

Primary Examiner—Alan Holler

[57] ABSTRACT

Ethylene is grafted onto polymers of conjugated dienes to form copolymers having both thermoplastic and elastomeric properties. This grafting is effected by a catalyst system comprising (1) a titanium or vanadium halide, (2) an aluminum trihydrocarbon and (3) a carbonyl compound such as acetophenone. The resultant graft copolymer has elastomeric properties due to the diene polymer backbone and thermoplastic properties from the grafted polymeric ethylene blocks.

21 Claims, No Drawings

PROCESS FOR GRAFTING ETHYLENE ONTO DIENE POLYMERS

BACKGROUND OF THE INVENTION

1. Field of the Invention:

This invention relates to a process for the grafting of ethylene onto a diene polymer, such as polybutadiene, in the presence of a catalyst comprising a titanium or vanadium halide, such as titanium tetrachloride, an aluminum trihydrocarbon, such as aluminum triisobutyl, and a carbonyl or thiocarbonyl compound, such as acetophenone.

2. Related Prior Art:

The grafting of ethylene onto conjugated diene polymers has been reported. However the product is a conglomeration of various polymers including the original or starting diene polymer and homopolymer of the olefin in addition to the grafted copolymer.

For example, Von G. Gerber et al disclose in "Makromolekulare Chemie": 64, 68 (1963) the grafting of ethylene onto butadiene polymers using $TiCl_4$ and $HAlR_2$ as the catalyst. The butadiene polymers have pendent vinyl groups to which dialkyl aluminum hydride is attached according to the reaction:

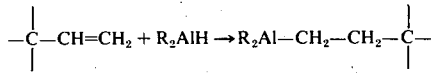

The resultant polymer having the dialkyl aluminum ethyl pendent group is then reacted with ethylene to produce polyethylene blocks. From the several extractions reported with various solvents it is obvious that the reaction product is a mixture of several types of polymers including homopolymers. Because of the variety of products obtained it is difficult to control the type of polymer produced and the removal of undesired homopolymers is necessary. Moreover it appears that this type of grafting requires the presence of pendent vinyl groups such as in 1,2 polybutadiene.

SUMMARY OF THE INVENTION

In accordance with the present invention, it has now been found possible to prepare graft copolymers with very little homopolymer byproduct or impurity therein from a base polymer of desired molecular weight of a conjugated diene and grafting thereon polymeric ethylene by the use of a catalyst system comprising (1) a halide having the formula $TiBr_nCl_{4-n}$ or $VBr_mCl_{5-m}$ wherein $n$ is an integer having a value of 0–4 and $m$ is an integer having a value of 0–5; (2) an aluminum hydrocarbon having the formula $AlR_3$ wherein R is aryl, cycloalkyl or preferably alkyl with R having 1–8 carbon atoms; and (3) a carbonyl or thiocarbonyl compound, such as acetophenone. In this catalyst system the ratio of Al to Ti or V is advantageously 0.9–3 moles, preferably 0.9–1.15 moles, of Al compound per mole of Ti or V; the ratio of CO(carbonyl) to Ti or V compound is 0.5–4, preferably 1–2 moles of CO per mole of Ti or V compound; and the ratio of Ti or V compound to monomer is 1–10 millimoles of Ti or V compound per 100 grams of monomer. Advantageously the grafting is effected in a hydrocarbon solution which contains 10–50% preferably 10–30% by weight of the base polymer.

The catalyst is used in a proportion of 1 to 10 millimoles per 100 grams of monomer. In referring to millimoles of catalyst, this corresponds to the millimoles of the titanium or vanadium compound since the catalyst is regarded or at least calculated as a complex of the titanium or vanadium compound with the other catalyst components.

The titanium or vanadium halides that may be used as one of the catalyst components include $TiCl_4$, $VCl_5$, $TiBr_4$, $VBr_5$, $TiBrCl_3$, $TiBr_2Cl_2$, $TiBr_3Cl$, $VBrCl_4$, $VBr_2Cl_3$, $VBr_3Cl_2$ and $VBr_4Cl$, and mixtures thereof. Preferably $TiCl_4$ or $VCl_5$ is used.

The $AlR_3$ or aluminum trihydrocarbons are preferably aluminum trialkyls. Alkyl groups of 1–8 carbon atoms are preferred in the above compounds but even larger groups or aromatic or cycloaliphatic groups such as phenyl, tolyl, xylyl, naphthyl, cyclohexyl, cycloheptyl, etc., may also be present in place of the alkyl groups in the respective compounds.

Typical $AlR_3$ compounds that may be used for this purpose include, but are not limited to: trimethyl aluminum, triethyl aluminum, tributyl aluminum, tripropyl aluminum, triheptyl aluminum, trioctyl aluminum, triphenyl aluminum, dimethyl-phenyl aluminum, tribenzyl aluminum, diethyl benzyl aluminum, tricyclohexyl aluminum, dimethyl cyclohexyl aluminum, etc.

Typical carbonyl compounds that may be used in the catalyst composition of this invention are preferably ketones such as acetophenone, benzophenone, etc., but other carbonyl compounds may be used such as carbon dioxide, aldehydes, such as acetaldehyde, butyraldehyde, benzaldehyde, etc., carboxylic acids and their anhydrides, such as acetic acid, benzoic acid, butyric acid, cyclohexanoic acid, phthalic acids, the corresponding anhydrides of these acids, such as acetic anhydride, phthalic anhydride, etc., the salts, esters and amides of such acids, such Na acetate, ethyl acetate, ethyl benzoate, acetamide, N,N-dimethylacetamide, etc., carbamates, such as ethyl carbamate, etc., ketones, such as diethylketone, methylethylketone, acetylacetone, etc. and preferably aromatic ketones, such as the aforementioned acetophenone and benzophenone and derivatives thereof having alkyl, and archloro substituent groups, such as p-chloroacetophenone, p-methylacetophenone, p,p'-dimethylbenzophenone, p,p'-dichlorobenzophenone, p-chlorobenzophenone, phenylacetophenone, etc. If desired, a portion or all of the carbonyl compound may be replaced by a thiocarbonyl or thiocarbamyl compound such as thioacetophenone, benzothiophenone, thioacetate acetylthioacetone, thioamides and dithiocarbamates, carbon disulfide, etc.

The catalyst combination is preferably prepared in the solution or suspension of diene base polymer. The order of addition of components is not critical although a preferred embodiment involves the addition of the reducing agent as the last component.

Conjugated dienes that may be used in preparing the base diene polymer for use in the practice of this invention include: 1,3-butadiene, isoprene, chloroprene, 2-phenyl-1,3-butadiene, piperylene, etc.

Diene copolymers can also be used where the comonomers impart desirable properties and do not detract from the polymer properties. The comonomers may be other conjugated dienes or vinyl aryl or isopropenyl aryl compounds or derivatives thereof having alkyl, aralkyl, cycloalkyl or chlorine attached to the aromatic nucleus, and preferably having no more than 20 carbon atoms. Typical of these aromatic comonomers are styrene, alphamethyl styrene, vinyl toluene, isopropenyl toluene, ethyl styrene, p-cyclohexyl styrene, o-, m- and p-Cl-styrene, vinyl naphthalene, vinyl methyl naphthalene, vinyl butyl naphthalene, vinyl cyclohexyl naphthalene, 1-vinyl-4-chloronaphthalene, 1-isopropenyl-5-chloronaphthalene, vinyl diphenyl, vinyl diphenylethane, 4-vinyl-4-methyl-diphenyl, 4-vinyl-4-chlorodiphenyl, and the like. Preferably such comonomers have no more than 12 carbon atoms. Where such comonomers are to be used, as much as 60%, preferably no more than 30% may be used.

The base diene polymer may be prepared by any convenient method provided there are no impurities, such as water, etc., remaining therein which will interfere or react with the catalyst system used in the grafting operation. It is found particularly suitable, as shown in the examples below, to prepare the polymer by anionic polymerization and to control the molecular weight of the base polymer by the amount of anionic catalyst, such as n-butyl lithium, used in the polymerization. Retention of the lithium in the polymeric molecule is not necessary for the purpose of this invention but its presence does not interfere with the grafting. It is therefore much more convenient to leave the lithium in the base polymer and thereby avoid the steps of deactivation and subsequent removal of the deactivation agent, such as alcohol.

The base diene polymer advantageously has a molecular weight (number average) of 10,000 to 1,000,000, preferably 50,000–1,000,000 when the ultimate product is to be used in tire compositions. It does not need to be high in 1, 2 content and may be predominantly or substantially all of 1, 4 structure.

The graft polymerization may be conducted in the temperature range of −35° C to 50° C, preferably 0° to 10° C. The temperature is advantageously one at which the base polymer is soluble to at least some extent in the reaction medium and one at which the grafting polymerization proceeds at a reasonably fast rate. Generally a noticeable amount of grafting is effected within 30 minutes although at least 4 hours graft polymerization time is desirable. Generally there is no need to exceed 16 hours of polymerization to effect the amount of grafting desired.

An inert atmosphere, such as nitrogen and an inert solvent medium should be used. The pressure may be atmospheric, but is preferably superatmospheric so that a concentration of ethylene may be built up. The grafting can be performed either batchwise or continuously.

The graft polymerization is advantageously effected in the presence of an diluent diluetn to facilitate handling of the polymer and to give better temperature control. Normally liquid hydrocarbons are preferred for this purpose, such as benzene, toluene, aliphatic hydrocarbons such as n-hexane, n-heptane, cyclohexane, etc. or propane, butane, propylene, ethylene, ethane, etc. with the use of higher pressures. However, while the copolymerization may be conducted in any of the above diluents, the catalyst system is advantageously prepared in a diluent containing at least 20% aromatic hydrocarbon, such as benzene, toluene, xylene, ethyl benzene, etc. The aromatic hydrocarbons appear to stabilize the catalyst complex. Nevertheless, once the catalyst complex is prepared and stabilized, the graft copolymerization may be conducted in aromatic, aliphatic or cycloaliphatic hydrocarbon diluents or mixtures thereof. Aprotic solvents such as dimethyl formamide, dimethyl acetamide, dimethyl sulfoxide, etc. may be used but because of the greater expense and difficulty in handling aprotic solvents the hydrocarbon solvents are preferred.

The ethylene is grafted in an amount representing 5–100%, preferably 10–60%, by weight of the base diene polymer. In the resultant graft copolymer, the proportion of ethylene depends somewhat on the proportion of thermoplasticity to elastomeric properties desired in the product but in most cases is in the range of 5–100 percent, preferably 10–60 percent, based on the base diene polymer. Where the product is to be used in tire applications, the polymeric ethylene portion should represent no more than about 50% by weight based on the diene portion. This represents about 33% of the combined portions. Generally a minimum of at least 5% of polymeric ethylene based on the combined portions needs to be present before the effect of its presence is noted. Where the graft copolymer is to be used in other applications such as where thermoplastic resins may be used the proportion of polymeric ethylenic may go as high as 90% of the combined weights of ethylene and diene portions. The length of the grafted polymeric ethylene blocks may be controlled by the amount of ethylene added to the reaction system and the length of the grafting period.

The rubbery copolymers of 1,3-butadiene and ethylene produced by the present invention have processing properties and practical physical properties superior to those of rubber products obtained from natural rubber. They can be used for articles such as tire carcases, tire treads, belting, industrial articles, sponge products and car accessories, and when the proportion of grafted polymeric ethylenic is very high they may be used in various molding products for which thermoplastic resins are generally used.

For the production of rubber products the copolymers may be mixed with other rubbery materials such as natural rubber, butadiene-styrene rubber, polybutadiene rubber, polyisoprene rubber, chloroprene rubber, butadiene-acrylonitrile rubber, butadiene-methacrylate rubber and ethylene-propylene rubber in any desired proportion. It is effective for improving the processing properties of such rubbery materials. Generally, such a rubber composition should contain at least 20% by weight of the copolymer of the present invention. Below 20%, there is little improvement in the processing properties and the physical properties of the cured rubber products.

The "dilute solution viscosity" referred to herein is defined as the inherent viscosity determined at 25° C. on a 0.4% solution of the grafted polymer in tetralin. It is calculated by dividing the natural logarithm of the relative viscosity by the percent concentration of the solution, i.e., it is the inherent viscosity measured at 0.4% concentration. The molecular weights reported herein are determined from these viscosities and are the number average molecular weights.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

A clean one-gallon stainless steel reactor equipped with stirrer, inlet, outlet and temperature control means is dried and swept clean of air and moisture with a stream of nitrogen. To this reactor there is introduced under an atmosphere of nitrogen a monomer blend of butadiene and toluene which has been dried by passing it through a 3A molecular sieve column over an hour period. The amount of blend added to the reactor comprises 180 gms of butadiene and 1,620 gms of toluene. Then n-butyl lithium (in hexane) is added in an amount to give 2 millimoles (mM) per 100 gms of butadiene. Polymerization is then conducted at 30° C for 6 hours. A sample of the polymer product is removed for analytical purposes and is found to have a molecular weight (number average) of 70,000, and a structure of 90% 1, 4 and 10% 1, 2. The main product, still containing the lithium, is used directly for the grafting operation of this invention by adding 5mM of $TiCl_4$, 5mM of acetophenone and 14mM of triisobutyl aluminum per each 100 gms of polybutadiene and stirring at 5° C for 30 minutes. Then 170 gms of ethylene is added from a tared cylinder and the reaction is allowed to proceed for 16 hours. The reaction is then terminated and the graft polymerization mass dropped into a large volume of isopropanol containing 1% antioxidant. The precipitated polymer product is removed and oven dried. Nuclear magnetic resonance (NMR) shows approximately 28% of ethylene in the grafted product, and molecular weight determination by dilute solution viscosity in tetralin shows a number average molecular weight of 93,000. When the polymer product is treated with propionitrile, a known solvent for homopolyethylene, there is no extract, indicating the absence of ethylene homopolymer in the product. Likewise when the polymer product is treated with heptane, a known solvent for homopolybutadiene, there is no extract, indicating the absence of butadiene homopolymer in the product.

EXAMPLE II

The procedure of Example I is repeated except that at the end of the butadiene polymerization the product is withdrawn from the reactor and an amount of methanol is added to the product solution slightly in excess of that calculated to react with the amount of lithium present. Then about 15 gms of toluene are added and approximately that amount of toluene distilled to insure the removal of any unreacted methanol. A measured sample is removed and from the amount of polymer contained therein it is calculated that there is substantially 100% conversion of butadiene to polymer. The product is then filtered under nitrogen to remove precipitate and then returned to the reactor, following which the addition of catalyst and grafting procedure are completed with similar results as in Example I. This indicates that the lithium present in Example I is not necessary for the grafting process of this invention.

EXAMPLE III

The procedure of Example I is repeated a number of times using the conditions and with the results shown in the table below:

TABLE

| Per 100 gms of Polybutadiene*: | A | B | C | D | E | F |
|---|---|---|---|---|---|---|
| $TiCl_4$ (mM) | 5 | 5 | 5 | 5.6 | 5.35 | 7 |
| Acetophenone (mM) | 5 | 5 | 5 | 5.6 | 5.35 | 7 |
| (i-Butyl)$_3$Al (mM) | 13 | 13 | 13 | 15.5 | 14.7 | 19 |
| Ethylene (gms) | 60 | 90 | 33 | 40 | 65 | 95 |
| Grafting Temp. (°C) | 5 | −1 | 2 | 3 | 5 | 16 |
| Polym. Prod. (gms) | 131.5 | 169.4 | 121 | 140 | 143 | 191 |
| Ethylene portion of polymer (gms) | 31.5 | 69.4 | 40 | 43 | 91 | |
| $T_m$ (°C) | 127 | 133 | 129 | 129 | 129 | — |
| $T_g$ (°C) | −93 | −92 | −88 | −92 | −92 | — |
| 1,4 (%) | 73.6 | 77.1 | 90.0 | 73.6 | 80.7 | 72.1 |
| Conversion of ethylene to graft Copolymer (%) | 52.5 | 64.7 | 64.0 | 100 | 66.1 | 95.8 |
| Calculated % of ethylene in Copolymer** | 24 | 41 | 17 | 28.6 | 30 | 47.6 |

*As shown in Example II, the conversion of butadiene to polymer is substantially 100%.
**See Footnote at bottom to table in Example IV.

EXAMPLE IV

The procedure of Example I is repeated a number of times using the conditions and with the results shown in the table below:

TABLE

| Per 100 gms. of Polybutadiene: | A | B | C | D | E | F | G |
|---|---|---|---|---|---|---|---|
| $TiCl_4$ (mM) | 7 | 7.7 | 7.9 | 8.25 | 5 | 7.3 | 5 |
| Acetophenone (mM) | 7 | 7.7 | 7.9 | 8.25 | 5 | 7.3 | 5 |
| (i-Bu)$_3$Al (mM) | 19 | 21.2 | 21.6 | 22.7 | 13.3 | 20.0 | 13.7 |
| Ethylene (gms.) | 46 | 21 | 21.8 | 23 | 27.6 | 21.5 | 44 |
| Grafting Temp. (°C) | 5 | 2 | 3 | 5 | 10 | 16 | 7 |
| Polym. Prod. (gms.) | 143 | 120.5 | 116.2 | 118.3 | 126 | 114.3 | 126.4 |
| Ethylene portion of polymer (gms.) | 43 | 20.5 | 16.2 | 18.3 | 26 | 14.3 | 26.4 |
| Ethylene portion of polymer (%)** | 30 | 17 | 10.9 | 15.5 | 20.6 | 12.5 | 20.9 |
| $T_m$ (°C) | 128 | 134 | 129 | 129 | — | 134 | 131 |
| $T_g$ (°C) | −93 | −93 | −93 | −93 | — | −94 | −93 |
| 1,4 (%) | 83.0 | 87.5 | 90.0 | — | 73 | — | — |
| Conversion of | | | | | | | |

TABLE-continued

| Per 100 gms. of Polybutadiene: | A | B | C | D | E | F | G |
|---|---|---|---|---|---|---|---|
| ethylene to graft Copolymer (%) | 93.5 | 97.6 | 74.4 | 80.0 | 94.2 | 66.5 | 60 |

*Dilute solution viscosity in tetralin for the grafted product is 3.66.
**The ethylene percentage is calculated on the basis that there is initially 100% conversion of butadiene to polybutadiene as shown in Example II and as is the general case under the conditions used. If there should be less than 100% conversion of butadiene to polymer in any particular case the percent of ethylene in the graft copolymer would be even higher than calculated. As will be noted in the various runs, see particular Runs B and G of Example III, the amount of grafted ethylene is increased with the use of larger amounts of ethylene monomer.

EXAMPLE V

The procedures of Examples I and II are repeated with similar results using in place of the acetophenone equivalent amounts respectively of:
a. Benzophenone
b. Benzaldehyde
c. Ethyl acetoacetate
d. Ethyl benzoate
e. Diethyl ketone
f. Acetyl acetone
g. Caprolactam
h. N,N-Dimethylacetamide
i. N-Ethyl-ethyl carbamate
j. Phthalic anhydride
k. Thioacetophenone
l. Carbon disulfide
m. Thiocaprolactam

EXAMPLE VI

The procedures of Examples I and II are repeated a number of times with similar results using in place of the butadiene equivalent amounts respectively of:
a. Isoprene
b. Piperylene

EXAMPLE VII

The procedures of Examples I and II are repeated a number of times with similar results using in place of the triisobutyl aluminum equivalent amounts respectively of:
a. Triethyl aluminum
b. Tripropyl aluminum
c. Trihexyl aluminum
d. Triphenyl aluminum
e. Tricyclohexyl aluminum
f. Tribenzyl aluminum

EXAMPLE VIII

The procedures of Examples I and II are repeated with similar results using in place of the $TiCl_4$ equivalent amounts respectively of:
a. $VCl_5$
b. $TiBrCl_3$
c. $VBr_2Cl_3$
d. $TiBr_4$
e. $VBr_5$

EXAMPLE IX

The procedures of Examples I and II are repeated with similar results using in place of the butadiene homopolymer various copolymers of vinyl aryl compounds as follow:
a. Butadiene-styrene (70-30)
b. Isoprene-styrene (60-40)
c. Butadiene-vinyl toluene (80-20)
d. Butadiene-alphamethyl styrene (75-25)
e. Butadiene-vinyl naphthalene (85-15)

It is apparent that the use of the carbonyl or thiocarbonyl compounds, together with the $AlR_3$ and other catalyst components, has the effect of avoiding or at least drastically reducing the presence of homopolymers in the grafting of ethylene to diene polymers. This is in marked contrast with the reaction produced with diethyl aluminum hydride as shown in the reference cited above. For the purpose of this invention the carbonyl or thiocarbonyl preferably has no more than 20 carbon atoms.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims:

The invention claimed is:

1. A process for the grafting of ethylene onto a polymer consisting essentially of 40–100 percent by weight of a conjugated diene and 0–60 percent by weight of an aromatic monomer having no more than 20 carbon atoms selected from the class consisting of vinyl and isopropenyl aryl compounds and derivatives thereof in which the derivative group is an alkyl, aralkyl, cycloalkyl or chlorine attached directly to the aromatic nucleus thereof comprising the steps of maintaining an intimate mixture of ethylene and said polymer at a temperature of −35° to 50° C. in intimate contact with a catalyst composition consisting essentially of:
   a. a metal halide compound having the formula $TiBr_nCl_{4-n}$ or $VBr_mCl_{5-m}$ wherein n has a value of 0–4 and m has a value of 0–5;
   b. an aluminum hydrocarbon compound having the formula $AlR_3$ wherein R is a hydrocarbon group having 1–8 carbon atoms selected from the class consisting of alkyl, aryl and cycloalkyl groups; and
   c. a carbonyl-containing or thiocarbonyl-containing compound selected from the class consisting of aldehydes, ketones and carboxylic acids, esters, amides and carbamates and the corresponding thiocompounds;
the concentration of said metal halide compound being 1–10 millimoles per 100 grams of said monomer composition, said $AlR_3$ compound being present in said catalyst composition in a proportion of 0.9–3 moles per mole of said metal halide compound and said carbonyl or thio-carbonyl compound being present in a proportion of 0.5–4 moles per mole of metal halide compound, said grafting reaction being conducted for a period of at least 30 minutes.

2. The process of claim 1 in which said grafting is effected in the presence of a diluent.

3. The process of claim 2 in which said diluent is a liquid hydrocarbon.

4. The process of claim 3 in which the weight of diene polymer is 10–50 percent by weight of the combined weight of said polymer and diluent.

5. The process of claim 1 in which the diene is 1,3-butadiene.

6. The process of claim 1 in which the polymer is a 1,3-butadiene homopolymer.

7. The process of claim 6 in which the metal halide is $TiCl_4$.

8. The process of claim 7 in which the $AlR_3$ compound is an aluminum trialkyl.

9. The process of claim 7 in which the $AlR_3$ compound is aluminum triisobutyl.

10. The process of claim 7 in which the $AlR_3$ compound is aluminum triisopropyl.

11. The process of claim 7 in which the $AlR_3$ compound is aluminum triethyl.

12. The process of claim 7 in which the amount of ethylene grafted represents 5–100 percent by weight based on the weight of the original diene polymer.

13. The process of claim 7 in which the amount of ethylene grafted represents 5–50 percent by weight based on the weight of the original diene polymer.

14. The process of claim 8 in which the time for said grafting reaction is 4–16 hours.

15. The process of claim 8 in which the grafting is effected at a temperature of 0° to 10° C.

16. The process of claim 15 in which the amount of aluminum trialkyl is 0.9–1.15 moles per mole of $TiCl_4$.

17. The process of claim 16 in which the amount of carbonyl or thiocarbonyl compound is 1–2 moles per mole of $TiCl_4$.

18. The process of claim 17 in which the carbonyl compound is acetophenone.

19. The process of claim 18 in which the time for said grafting reaction is 4–16 hours.

20. The process of claim 1 in which the time for said grafting reaction is 4–16 hours.

21. The product produced according to the process of claim 1.

* * * * *

UNITED STATES PATENT OFFICE
CERTIFICATE OF CORRECTION

Patent No. 3,953,542     Dated April 27, 1976

Inventor(s) Adel Farhan Halasa & Richard Gutierrez

It is certified that error appears in the above-identified patent and that said Letters Patent are hereby corrected as shown below:

In Column 3, Line 51, "an diluent diluetn" should read
--an inert diluent--.

In Column 6, Line 40, should read as follows:
--of polymer(gms)    31.5    69.4    21    40    43    91--.

In Column 6, Line 50 (second footnote), "of" should be --to--.

Signed and Sealed this

Seventeenth Day of August 1976

[SEAL]

Attest:

RUTH C. MASON
*Attesting Officer*

C. MARSHALL DANN
*Commissioner of Patents and Trademarks*